Aug. 11, 1964  D. P. RUTTER ETAL  3,144,069
METAL SHEATHED INSULATING BLANKET
Original Filed Nov. 12, 1953  6 Sheets-Sheet 1
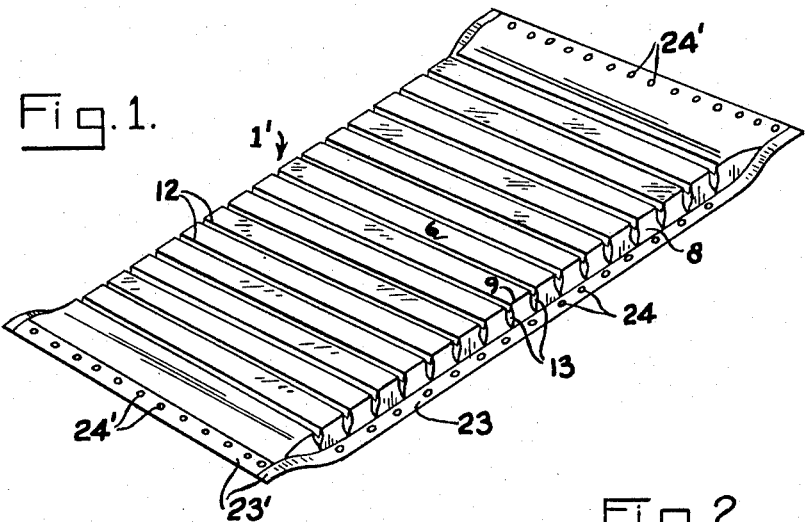
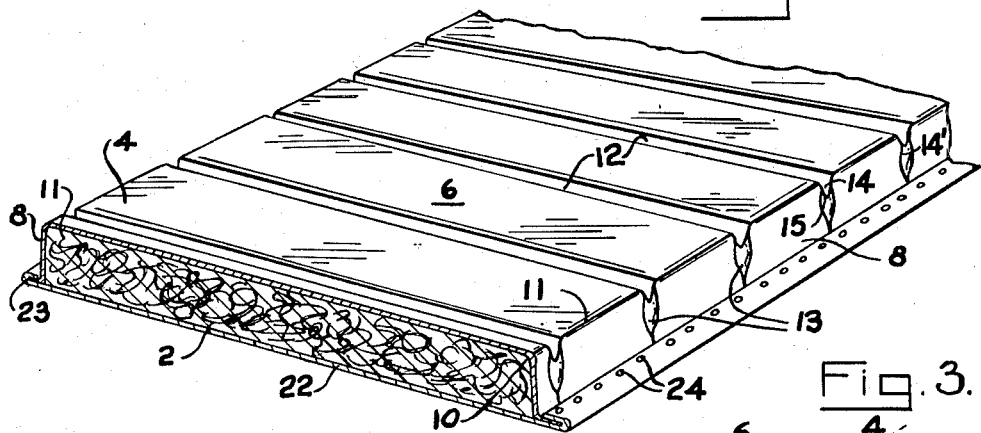
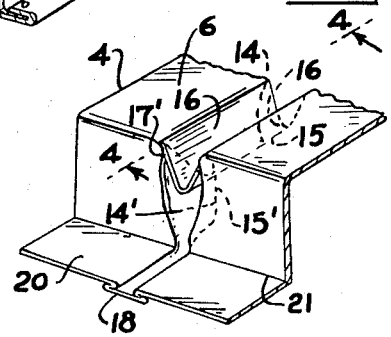
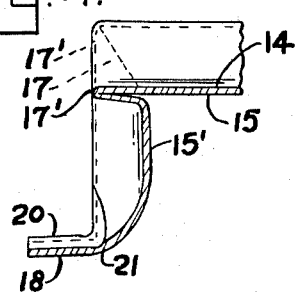
INVENTOR.
DONALD P. RUTTER
ANTHONY E. CIMOCHOWSKI
BY
ATTORNEY

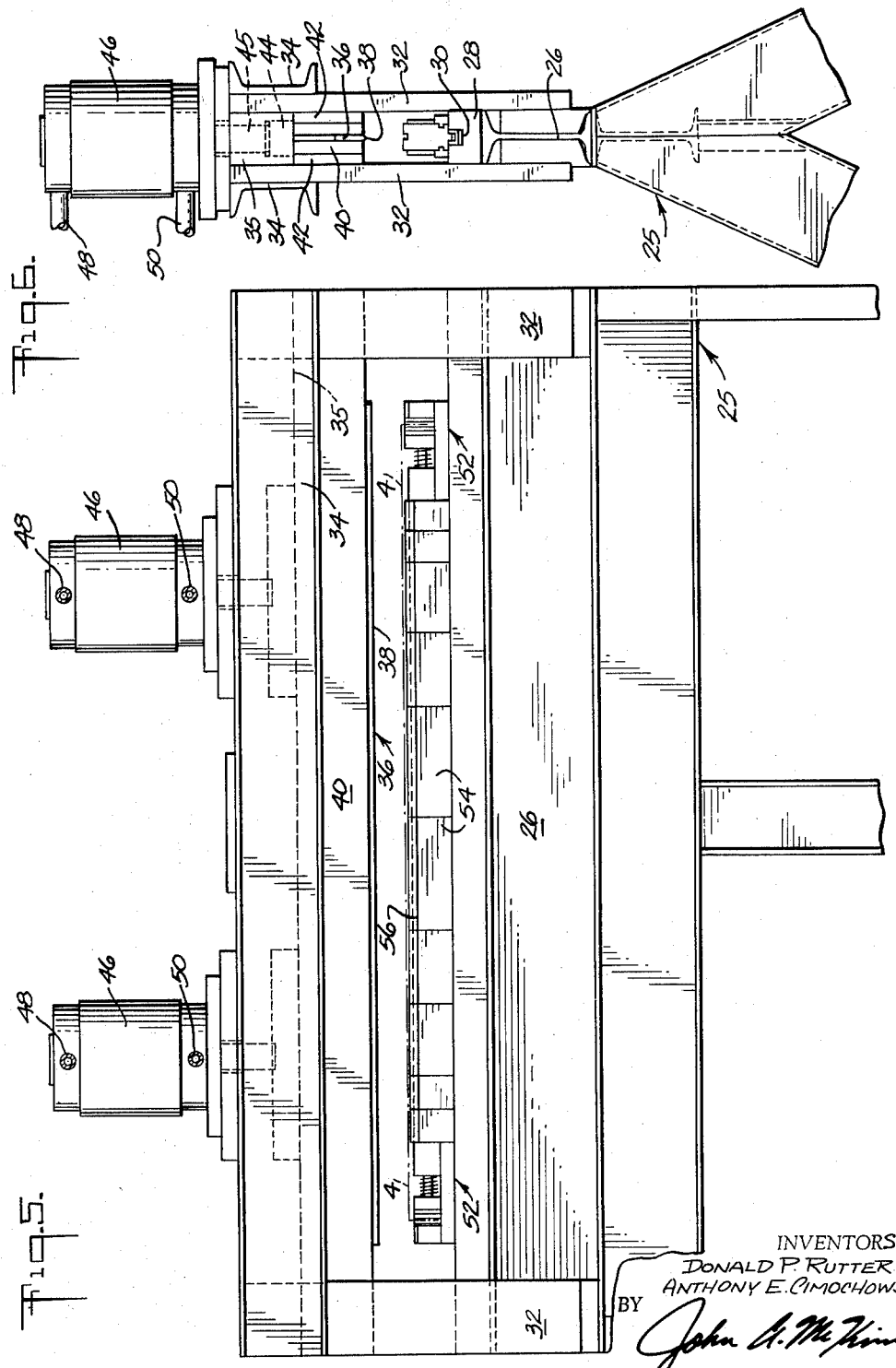

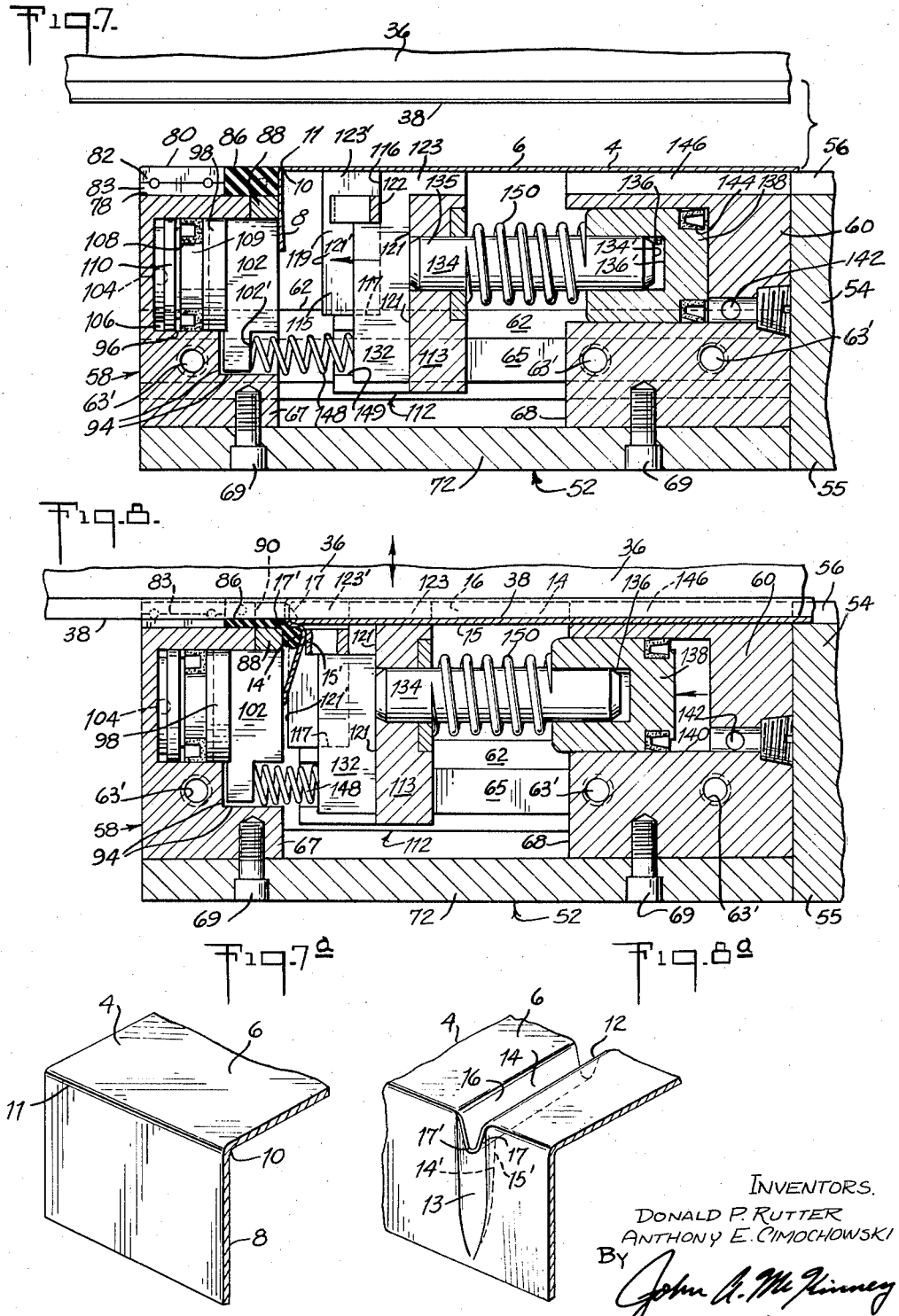

INVENTORS:
DONALD P. RUTTER
ANTHONY E. CIMOCHOWSKI
BY
ATTORNEY

Aug. 11, 1964   D. P. RUTTER ETAL   3,144,069
METAL SHEATHED INSULATING BLANKET
Original Filed Nov. 12, 1953   6 Sheets-Sheet 5
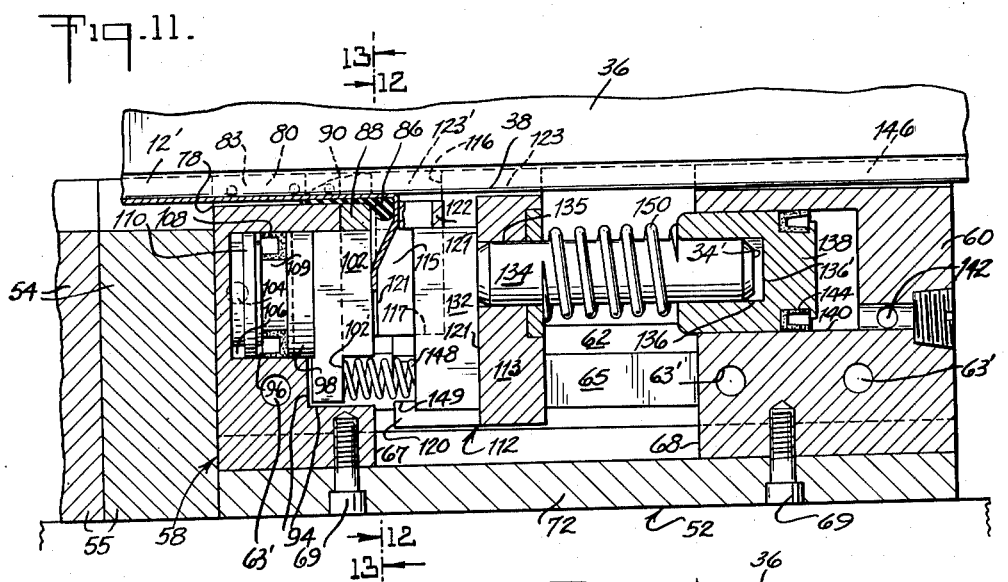
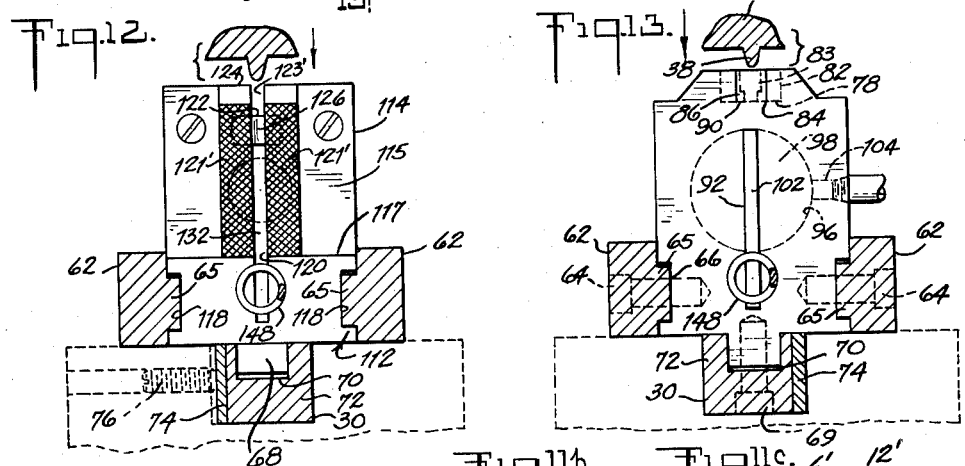
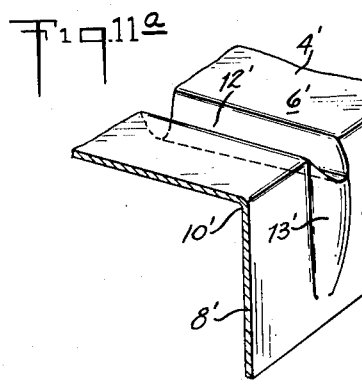
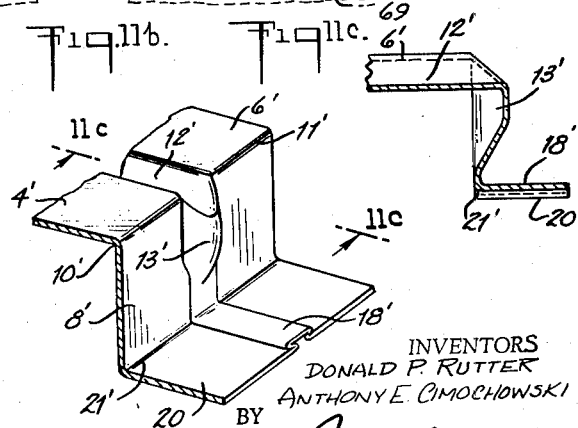
INVENTORS
DONALD P. RUTTER
ANTHONY E. CIMOCHOWSKI
BY John A. McKinney
ATTORNEY

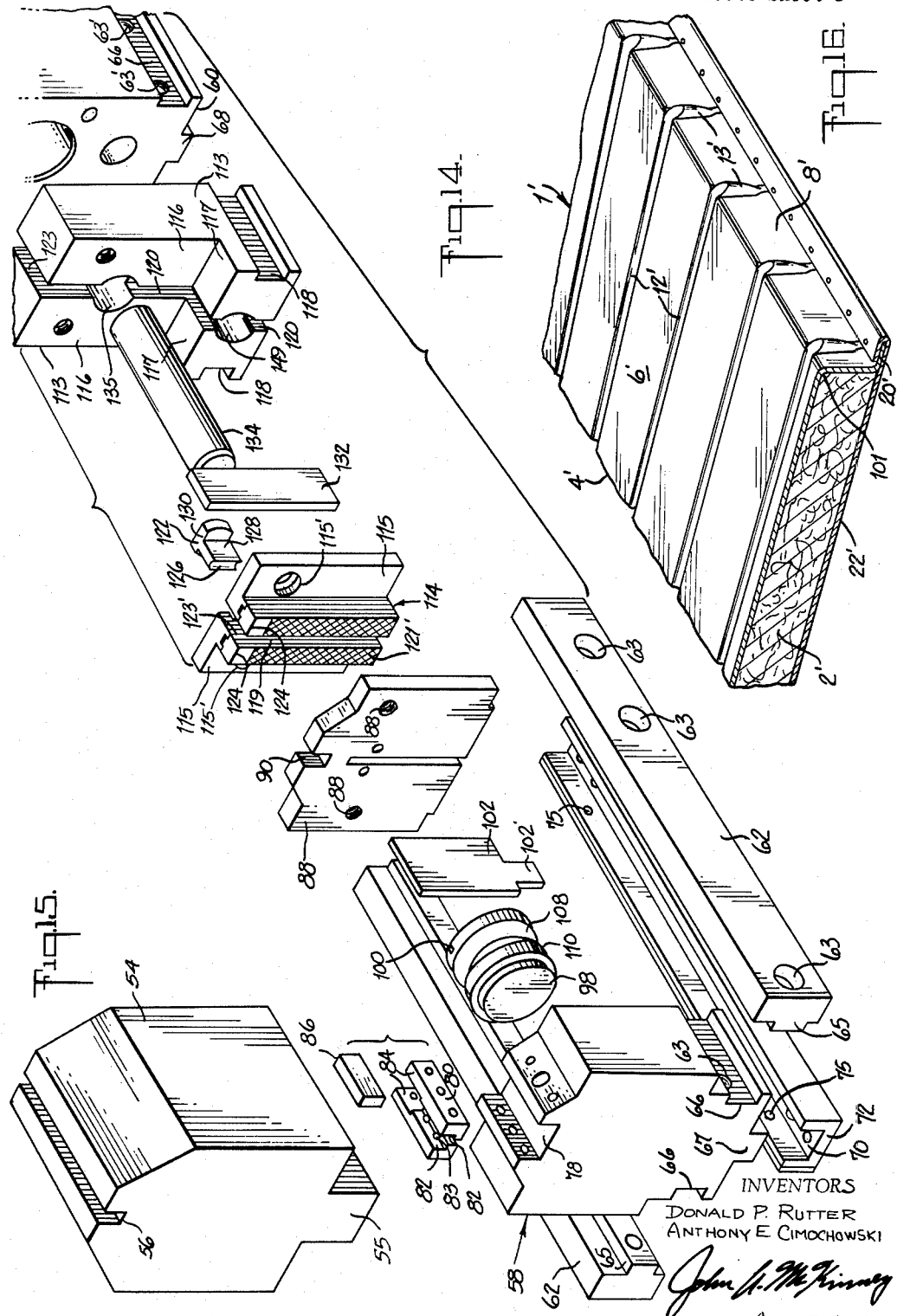

United States Patent Office 3,144,069
Patented Aug. 11, 1964

3,144,069
METAL SHEATHED INSULATING BLANKET
Donald P. Rutter, Bernardsville, and Anthony E. Cimochowski, South Somerville, N.J., assignors to Johns-Manville Corporation, New York, N.Y., a corporation of New York
Original application Nov. 12, 1953, Ser. No. 391,472, now Patent No. 2,975,821, dated Mar. 21, 1961. Divided and this application Jan. 18, 1961, Ser. No. 83,452
6 Claims. (Cl. 153—2)

This invention relates to heat insulation of the type comprising a sheet metal enclosed flexible insulation blanket adapted for application to high temperature curved surfaces such as presented by engine cylinders, the tail cones of jet engines, and the like, and to a method and apparatus for making such insulation. The invention relates particularly to improvements in such a corrugated sheet metal sheathed flexible insulation blanket as disclosed in United States Patent No. 2,576,698, issued November 27, 1951, in the name of Gaillard R. Russum, and to an improved method and apparatus for making insulation of the type disclosed in said patent. This application is a division of copending application Serial No. 391,472, filed November 12, 1953, now U.S. Patent No. 2,975,821, issued March 21, 1961.

As illustrated in Patent No. 2,576,698, it has been the practice to form that segment of the sheet metal enclosure which is to receive the corrugations to impart flexibility thereto with the corrugations extending transversely of the segment and to the direction of intended curvature. It has also been considered desirable to extend the side walls of the segment at a relatively sharp angle to the corrugated base portion of the segment, so that the thickness of the insulating portion of the blanket is substantially uniform throughout its width. The use of such an angular corner construction, or so-called box edge, in the segment to be corrugated poses problems in the corrugating operation, principally the difficulty of avoiding wrinkling and rupturing the sheet metal at the corner in the formation of corrugations in the base and side wall of the segment adjacent the corner. The formation of the corrugations in the side wall, as well as the base, is desirable to compensate for the shortening of the base when the corrugations are formed therein and to contribute to the flexibility of the segment when applied to the curved surface to be insulated. In one type of construction now employed, the corrugations running transversely of the base of the segment are formed with their lands extending inwardly from the inside face of the base, and the corrugations in the side walls are formed with their lands lying in substantially the same plane as the respective corrugations in the base, but with the lands formed outwardly from the outside faces of the side walls, so that the corrugations are reversed adjacent the corners. The resulting structure has the disadvantage that the lands of the side wall corrugations protrude in the direction in which they are visible in the completed blanket, so as to present a somewhat undesirable appearance. In certain installations, the projecting lands of the side walls are also undesirable from a structural standpoint.

It is an object of the instant invention to provide a type of corrugation in the base and side wall of the segment to be corrugated, which will be suitable to any angle made by the corner formed by the line of junction of the side wall and the base, without the disadvantages of having the corrugation protrude outwardly from the side wall.

It is a further object of the invention to provide a type of corrugation in the sheet metal segment to be corrugated in which the side wall of the segment extends from the base to form an angular corner therewith and in which the respective corrugations in the base and side wall are formed with their lands extending inwardly thereof and lying in substantially common planes therethrough at the corner.

It is a more particular object of the invention to provide a corrugated structure of the type described in which the flexibility in either direction of bending of the segment is preserved, and in which the respective base and side wall corrugations are neatly joined at the corner of the segment without cracks or ruptures.

Another object of the invention is to provide a method of forming the base and side wall corrugations as described, and particularly a method of forming these corrugations simultaneously adjacent the corner and of completing the formation of the side wall corrugations to the outer edge of the side wall, and of flattening portions of the side wall corrugations adjacent the outer edge of the side wall to provide edge flanges for securement to that segment of sheet metal which is to complete the formation of the envelope or sheath for the interior flexible blanket.

A still further object of the invention is to provide apparatus for forming the corrugations in the manner described and for flattening the portions of the side wall corrugations adjacent the outer edge of the side wall in order to provide a relatively flat edge flange for securement to the segment of sheet metal which will complete the enclosure about the flexible interior insulating blanket.

Other objects of the invention will become apparent from the detailed description that follows, with reference to the attached drawings, in which:

FIG. 1 is a perspective view of a typical improved corrugated sheet metal sheathed insulating blanket of the instant invention;

FIG. 2 is an enlarged fragmentary perspective view of the sheathed blanket of FIG. 1, showing a transverse section taken between corrugations thereof;

FIG. 3 is an enlarged fragmentary perspective view of one side or edge of the corrugated sheet metal segment of FIGS. 1 and 2, illustrating details of the corrugation formation at the corner, and of a flattened portion of the corrugation in an outer edge flange portion of the side wall;

FIG. 4 is a view in cross-section taken on the line 4—4 of FIG. 3;

FIG. 5 is a view in side elevation of press and die apparatus forming a portion of the invention, with a sheet metal segment in position to be corrugated, and parts of the construction forming no part of the invention being broken off;

FIG. 6 is a view in end elevation of the apparatus shown in FIG. 5, but omitting the sheet metal segment;

FIG. 7 is an enlarged view of a portion of the apparatus as viewed at the left side of FIG. 5, certain of the die structure and the sheet to be corrugated being shown in cross-section on a vertical plane therethrough, with the dies in open position;

FIG. 7a is an enlarged fragmentary view of one side wall and the main body portion or base of the sheet metal segment to be corrugated, showing a transverse section therethrough;

FIG. 8 is a view similar to FIG. 7, but showing certain of the dies in closed position, and illustrating the step of forming the corrugaton in the base of the sheet metal segment, and the forming of that portion of the corrugation in the side wall adjacent the corner;

FIG. 8a is a view similar to FIG. 7a, but showing details of the form of the corrugations produced by the operation of the dies to the position illustrated in FIG. 8;

FIG. 11 is a view corresponding to FIG. 8, but illustrating an arrangement in which the side die structure is turned end-for-end in order to form the side wall corrugations outwardly instead of inwardly, the side die structure shown being that which would appear at the right in the apparatus as shown in FIG. 5;

FIG. 11a is a view similar to FIG. 8a, but showing the formed portion of the side wall corrugation turned outwardly, as produced by the step illustrated in FIG. 11;

FIG. 11b is a view similar to FIG. 3, showing the form of a completed outwardly turned corrugation of the type illustrated in FIG. 11a, and produced by actuating the die elements arranged as illustrated in FIG. 11 through a complete cycle of operation, followed by an edge flange bending operation;

FIG. 11c is a cross-sectional view taken on the line 11c—11c of FIG. 11b;

FIG. 12 is a cross-sectional view of the die apparatus taken on the line 12—12 of FIG. 11, but with the dies in open position and the sheet metal segment removed;

FIG. 13 is a view similar to FIG. 12 but looking in the opposite direction, as indicated by the arrows at 13—13 in FIG. 11;

FIG. 14 is an exploded view showing details of the side die structure;

FIG. 15 is a perspective view of a spacer block used to space the separate side die structures the desired distance apart in the press; and FIG. 16 is a view similar to FIG. 2, but showing a sheathed blanket having the side wall corrugations formed outwardly in the manner illustrated in FIGS. 11 through 11c.

Figure 9:
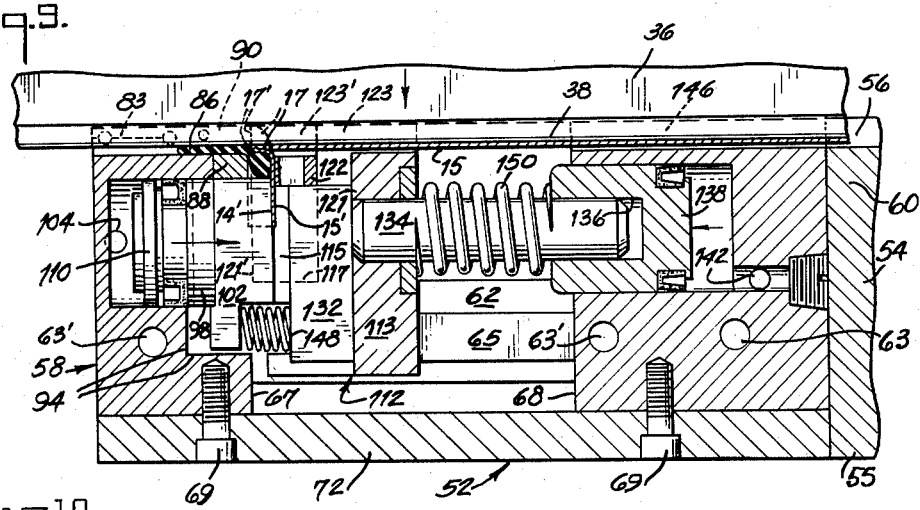
FIG. 9 is a view similar to FIG. 8, but showing a male side die actuated to closed position to complete the formation of the corrugation in the side wall.

Referring to FIGS. 1 through 4 in particular, a metal sheathed insulating blanket 1 of the type described comprises a flexible thermal insulating blanket or filler material 2 enclosed by a sheathing comprising a relatively thin and flexible sheet metal section 4 having a main body or base portion 6 and side walls 8 extending angularly therefrom, both in the same general direction, at relatively clearly marked lines of junction 9 with the base to form angular inside and outside corners 10 and 11 therewith. Formed in the base and side walls and extending transversely thereof, and with respect to the lines of junction are spaced corrugations 12 and 13, respectively, with the respective corrugation grooves 14, 14¹ formed in the outer faces of the base and side walls and with the respective corrugation lands 15, 15¹ all extending inwardly from the inner faces of the base and side walls, the portion of the axis of each of the corrugations of each side wall adjacent its respective line of junction with the base lying in substantially the same plane through that line of junction as the portion of the axis of the corresponding corrugation in the base adjacent the line of junction. In the preferred form illustrated, in which the side walls extend substantially at right angles to the base, the ends of the walls 16 and lands 15 of the corrugations 12 in the base terminate substantially flush with the adjacent portions of the outside face of the respective side walls, as at 17¹, and the base corrugation grooves 14 open therethrough. The ends of the side wall corrugations toward the lines of junction 9 are joined respectively to the adjacent ends of corresponding base corrugations, each by a portion 17 of the metal of the side wall extending into that end of the groove of the side wall corrugation and shaped complementary to the proximate end of the land of the corresponding base corrugation, and nesting therewith. The portion 17 forms in effect a saddle straddling the base corrugation land, and joined thereto on a U-shaped fold line 17¹ adjacent the corner and closing the adjacent end of the side wall corrugation, fold line 17¹ lying substantially flush with the outer face of the side wall, as previously indicated.

As will be more clearly apparent in FIGS. 3 and 4, the lands 15¹ of the side wall corrugations are flattened as at 18 against the inside surface of their respective side walls for a portion of their lengths inwardly from the outer edge of the side wall in order to form a relatively flat edge flange portion 20. The edge flange 20 is turned up on a line of fold 21, positioned according to the desired thickness of the blanket, so as to lie substantially parallel with the base. A cover sheet 22, shaped and dimensioned to overlie the edge flanges and to span the base, preferably with some overlap, is secured to the edge flanges in any suitable manner, such as by an overlapping fold 23 spot-crimped as at 24 or otherwise secured to the edge flanges, to provide an effective seal against moisture penetration. The cover sheet and the corrugated section may be secured together in similar sealed engagement at the ends of the blanket in any suitable manner, as by tapering the side walls adjacent their ends and making an overlapped and spot-crimped folded connection thereat such as illustrated at 23¹, 24¹.

An insulating blanket having a metal sheath formed as described fulfills the objects stated, being applicable to curved surfaces to be insulated, either with the corrugated segment turned inwardly toward the curved surface or in the reversed position in which the cover sheet is turned inwardly and the corrugated segment extends outwardly from the surface to be insulated. The construction described permits desired flexure in either direction, and does not have a tendency to develop wrinkles or wrinkle ruptures during application. As is well understood in the art, if the sheathed blanket is to be applied to a frusto-conical surface such as the tail cone of a jet engine, its shape viewed in plan prior to application to the curved surface will be generally similar to that illustrated in FIG. 6 of the aforementioned Russum Patent No. 2,576,698.

The preferred method of making the article heretofore described may be best understood by reference to the novel apparatus for performing the method, as illustrated in FIGS. 5–15. As shown in FIGS 5 and 6, this apparatus comprises certain conventional press structure, including a rigid stand indicated generally at 25 and having rigidly fixed thereon a bed rail 26 supporting on its top surface an elongated platen 28 having a groove 30 formed in its top surface. Spaced end rails 32 extend upwardly from the sides of the end portions of the bed rail and are rigidly fixed thereto. Fixed to the sides of the upper end portions of end rails 32 are top horizontal rail members 34 and end rail spacer member 35. A main overhead male die member 36 having die edge 38 formed to a proper cross-sectional shape to produce a corrugation groove 14 to be formed in the base of the sheet metal segment is supported in elongated horizontally extending beam structure 40 in rigid relation therewith. To the sides of the end portions of the beam structure 40 are affixed wear plates 42 received between end rails 32 for sliding contact therewith during reciprocation of the die member 36 vertically therebetween from open die to closed die positions. Beam 40 is connected through arms 44 and rods 45 to pistons (not shown) in air cylinders 46, for movement therewith. The pistons are mounted in cylinders 46 for two-way actuation by air pressure applicable selectively thereto through conduits 48, 50 in the reciprocation of the male die member 36 between its open and closed positions. The press apparatus thus far defined is conventional.

Mounted in groove 30 of platen 28 is composite female die structure comprising spaced side dies indicated generally at 52 and intermediate spacer blocks 54, spacing the side dies a distance corresponding to the width of the base of the sheet metal segment 4 to be corrugated and each having a tongue 55 fitting in groove 30 and providing an upwardly opening groove 56 (see FIG. 15) lying in substantially the same plane as the main overhead die member 36, the grooves 56 being in alignment and serving in effect as a portion of a female die for cooperation with the main overhead male die in forming a corrugation 12 in the base of the sheet metal segment to be corrugated. The side die structures 52 are the same in each case. Accordingly, the details of construction of only one side die structure will be described.

Referring particularly to FIGS. 7, 11, and 12 through 15, the details of the side die construction and the manner of mounting the side dies and spacer blocks in the groove 30 of platen 28 are illustrated. The side dies 52 each comprise first and second laterally opposed and spaced blocks 58 and 60 secured to side tie bars 62, as by screws 64 passing through apertures 63 and tongues 65 of the side bars and into threaded apertures 63¹ in the blocks 58 and 60 at the bases of aligned side grooves 66 formed therein to receive the tongues 65. Blocks 58 and 60 have aligned tongues 67 and 68, respectively, projecting from their bottom surfaces, these tongues being secured, as by screws 69, in groove 70 of bottom tie bar 72, which in turn is adjustably secured in the groove 30 of platen 28, as by means of set screws 76 bearing on a replaceable wear plate 74 at one side of the bottom tie bar 72. Wear plate 74 is secured to tie bar 72 by screws 75. The set screws 76 are applied to the wear plate through the corresponding wall of platen 28. The tie bars 62 and 72 combine with block members 58 and 60 to form in effect a side die frame supporting the relatively movable elements of the composite side die.

The first block 58 has a groove 78 in its top surface replaceably receiving rigid bars 80 having the shape illustrated in FIG. 14. Bars 80 extend in slightly spaced relationship longitudinally of groove 78 and have portions of their lengths relieved at one end as shown at 82 to form one section 83 of the upwardly opening groove, provided in part by the aligned grooves 56 in the spaced blocks 54, which is to receive the edge 38 of the main overhead male die member 36 when it is actuated to closed position. The bars are further relieved at their other ends as shown at 84 to, in effect, widen groove 83 in order to receive a preferably rectangular block 86 of resilient, deformable, extrudable material such as rubber. There is secured to the main body portion of block 58, on the side facing toward block 60, a face plate 88 by securing means passing through the openings 88', the outer surface of the plate 88 lying substantially flush with the corresponding end surface of the extrudable block 86. Plate 88 contains a central, vertical, upwardly open groove 90 in its top edge, in alignment with grooves 56 and 83, for receiving the edge 38 of the die member 36, and corresponding in width to the width of the extrudable block 86, received therein. Plate 88 also contains a central vertical slot 92 having its upper end spaced vertically below groove 90 and lying in substantially the same plane as the extrudable block 86 and the main overhead male die member 36. First block 58 has a central vertical slot 94 lying in substantially that same plane and forming an inward continuation of slot 92. Slot 94 terminates at a portion of its base in a horizontal cylindrical bore 96 in which is mounted piston 98 having a vertical groove 100 in its forward face for receiving the rear edge of a male side die plate 102, the piston and plate being reciprocable in the cylinder 96 and in composite slot 92, 94 respectively. Opening 104 formed through a wall of block 58 may communicate in any suitable manner, as by a conduit, not shown, with a source of fluid under pressure, not shown, and with an annular space 106 provided between a relieved portion of the piston and the cylinder wall, the flow of fluid to the cylinder being controlled by any suitable valve mechanism, not shown. Annular packing illustrated at 108 in relieved portion 109 of the piston prevents the leakage of any fluid which may get past land 110 formed on the piston. It will be noted that the construction of block 58 is such that it provides a pair of intersecting faces defining a substantially right-angle corner formed in part by the upper and forward end faces of the extrudable block 86, and in part by the uppermost surfaces of the block 58 and bars 80, and the uppermost and forward surfaces of plate 88 adjacent thereto. It will also be noted that the narrower portion of groove 83 forms a partial closure at the rearward end of the block 86, against which it abuts, for a purpose to be made clear later.

Slidably mounted between blocks 58 and 60 and in alignment therewith, is third block 112, comprising a main body portion 113 and a face plate 114 made up of sections 115, secured against face 116 of the main body portion 113 by securing means passing through openings 115', and having their lower edges received on a ledge 117 provided by an offset portion thereof. The body portion 113 has side grooves 118 aligned with grooves 66 of blocks 58 and 60 and slidably mating with tongues 65 so as to guide block 112 in its reciprocating motion along the top of the bar 72 and platen 28. Sections 115 of face plate 114 are spaced from each other to provide an outer and upper portion 119 of a central vertical female side die slot aligned with, and opening toward, the die plate 102. Sections 115 have knurled surfaces 121¹ adjacent to the slot portion 119 and opposed to similarly located surfaces on the face plate 88 adjacent the slot 92 therein. Centrally located in the offset portion providing ledge 117 of the main body portion 113 of block 112 is vertical slot portion 120, forming a continuation of slot portion 119 and terminating at its inner end in a central web portion 121 of main body portion 113. Slot portion 120 opens upwardly behind element 122 and above web 121 to form a portion 123 of a groove in the top of block 112 and having a continuation 123¹ formed by the space at the top of the block above element 122 and between the sections 115. Groove portions 123 and 123¹ are aligned with grooves 56, 83, and 90, to receive the die member 36. Slot portion 119 has a junction at its upper end with groove portion 123¹ adjacent a substantially right-angle corner 124 of block 112 provided by the intersection of surfaces 121¹ with the flat top surfaces of sections 115. Element 122 has a concave forward edge 126 forming a bottom for the upper portion of the female die slot portion 119 for serving a purpose to be hereinafter explained. The concave edge 126 may be provided on stem 128 of member 122, the stem 128 projecting between the sections 115 and having a flanged head 130 received in recesses in the rear surfaces of sections 115. The rear surface of head 130 is flush with the rear surfaces of the sections 115 so that the latter can in turn be secured flush against faces 116 so as to hold member 122 in place. Mounted in composite slot 119, 120 for reciprocation horizontally therein is smasher plate 132, to which is affixed rod 134 extending slidably through bore 135 in main body portion 113 of block 112 and received slidably in bore 136 of piston 138. Piston 138 is mounted for reciprocation in horizontal bore 140 of block 60 opening toward block 112. Fluid under pressure from a source not shown can be admitted to the rear of piston 138 through opening 142. Packing 144 serves to prevent leakage of fluid past the piston 138. Block 60 has upwardly opening groove 146 formed in its upper surface in alignment with grooves 56, 83, 90, 123, and 123¹ to cooperate therewith in receiving the edge 38 of the main overhead male die member 36 in the manner previously indicated.

First resilient means in the form of compression spring 148 are provided to urge the third block 112 toward the second block 60, and second resilient means in the form of compression spring 150 are provided to urge the third block 112 toward the first block 58, the forces provided by the springs being balanced so as normally to hold the third block 112 in an open die position in which it is spaced from the first block 58 and also the second block 60. The fluid pressure applicable to the rear of piston 138 can be controlled through suitable valves, not shown, so as to produce either a relatively low or relatively high pressure, both of which are strong enough to overcome this balance of forces and move the third block toward the first block for a corrugating operation. The purpose of the different pressures will be explained hereafter.

It will be noted that, as illustrated, spring 148 extends through an opening 149 in main body portion 113 of block 112, the opening 149 being formed as an enlargement of slot 120, and spring 148 reacts between die plate 102 and smasher plate 132 to urge the former to a retracted stop position in which its forward male-die-forming edge lies substantially flush with the forward surfaces of the face plate 88 adjacent to the portion 92 of the composite slot 92, 94 in which the plate reciprocates. Smasher plate 132 is similarly held in a retracted stop position in its slot by the action of spring 148. Spring 148 bears against a notched portion 102¹ of the die plate 102 at a point below the face plate 88. Spring 150 reacts between the piston 138 and the third block 112, with the piston 138 resting in a stop position in bore 140, exemplified by showing piston 138 against the inner end of the bore 140, when the third block 112 is in the open die position (see FIG. 7). In this position, the end 134¹ of the rod 134 is spaced from the bottom or the inner end 136¹ of the bore 136 in the piston 138. Thus it will be seen that the first and second resilient means react between the fixed first and second blocks and the slidable third block through the die plate 102 and smasher plate 132 and through the piston 138 and the adjacent side of the third block, respectively.

Figure 10:
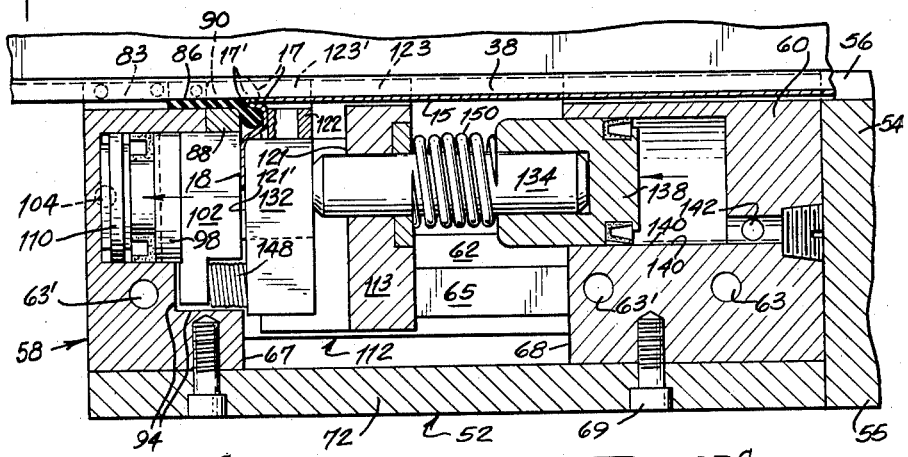
FIG. 10 is a view similar to FIG. 9, but showing a female side die block closed tightly against the male side die block to grip the side wall adjacent the corrugation therein, and a smasher plate advanced through the female side die to flatten a portion of the corrugation of the side wall adjacent its free, outer edge.
Figure 9A:
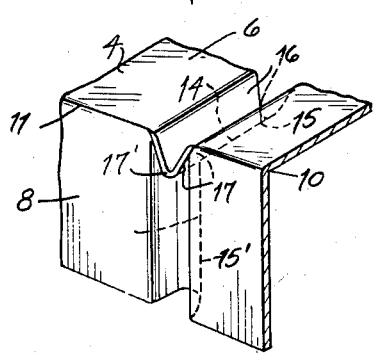
FIG. 9a is a view similar to FIG. 8a, but showing the form of the corrugations produced at the conclusion of the step illustrated in FIG. 9.
Figure 10A:
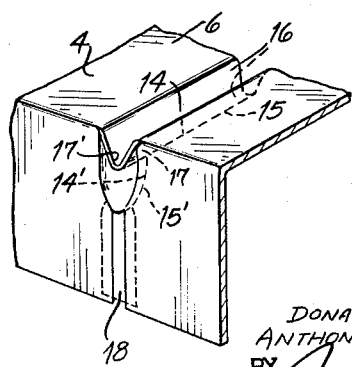
FIG. 10a is a view similar to FIG. 9a, but showing the flattened portion of the side wall corrugation produced by the step illustrated in FIG. 9.

The operation of the above-described apparatus will be explained with particular reference to FIGS. 7 through 11c, showing the sequence of steps and the effect of each operation on the sheet metal segment 4 to be corrugated. A sheet metal strip is first trimmed to the proper width and an edge portion, or both edge portions thereof, are folded at an angle as previously described and as shown in FIG. 7a to form the side wall or side walls 8 of the segment 4 to be corrugated. In forming the corrugations in the segment 4 as in the article shown in FIGS. 1–4 and 7–10a, the segment is then placed over the composite female die structure formed by the side dies 52 and such intermediate spacer blocks 54 as may be required, with side walls between face plates 88 and 114 of blocks 58 and 112, respectively, and with the outside faces of the side walls against the previously described surfaces of the first blocks 58 which face the third blocks 112. The portions of the side walls to be corrugated adjacent the outside corners 11 are placed against the adjacent ends of the extrudable blocks 86. The inside face of the base 6 of the segment to be corrugated rests on the substantially flat and coplanar uppermost surfaces of the side die structures 52 and the intermediate spacer blocks 54. By actuation of the valve admitting fluid under pressure through conduits 48 to the cylinders 46, the overhead main male die member 36 is lowered to closed position, shown in FIGS. 8, 9, 10 and 11. This forms a corrugation 12 in the base 6, with the corrugation land 15 extending inwardly, and at the same time extrudes the rubber in the block 86, or most of it, laterally to form the portion of the corrugation in the side wall adjacent the corner 11 of the segment 4, thus producing a construction illustrated in detail in FIG. 8a. The lesser width and depth of the groove 82 at the rearward end of the block 86 of extrudable material substantially prevents its extrusion in that direction. Some excess rubber flows upwardly around die member 36 and on the outside of the end of the corrugation land 15 at the corner 11, this apparently helping to provide the smooth configuration of the saddle portion 17 of the sheet metal of the side wall, which, as previously explained, is formed around the proximate end portion of the land of the corrugation in the base in complementary fashion and closes the end of the side wall corrugation adjacent to the corner of the segment. It will also be noted that the fold line 17¹ is made cleanly and substantially flush with the outer face of the side wall in this step in the operation. In order to provide a female side die to cooperate during this operation with the extruded rubber, which actually serves as a portion of the male side die, in the formation of the corrugation in the side wall adjacent the corner of the segment, the third block 112 has been actuated to the position shown in FIG. 8, under the relatively low fluid pressure previously mentioned as selectively applicable to piston 138, this pressure being sufficient to urge the piston and the third block forwardly against the action of spring 148 to a position in which the female side die elements comprising plate 88, the side walls of slot 119, die 38, and the edge 126 of the member 122 come into closed die position as shown in FIG. 8, but not sufficient to override spring 150 and cause the rod 134 to bottom out in piston 138. It will be seen that the concave edge 126 of element 122 forms a shaped bottom for the upper portion of the composite female side die groove to cooperate with the extruded rubber in forming that portion of the side wall corrugation 13 adjacent the saddle 17. With the die elements in this relative position, male die plate 102 is actuated by applying fluid pressure to the piston 98 sufficiently strong to move the die plate forwardly to the closed die position shown in FIG. 9 against the force of spring 148 but not strong enough to override the spring 150. This completes the corrugation 13 in the side wall begun by the extrusion of the rubber block. Thus, the spring 148 constitutes means acting between the block 58 and the block 112 for resisting the movement of the block 112 toward the block 58 during the formation of a side wall corrugation. Also, the piston 138 and the spring 150 constitute means acting on the block 112 to urge the block 112 toward the block 58 against the resistance of the spring 148 during the formation of a side wall corrugation. At the end of this step, the corrugations in the base and side wall are as shown in FIG. 9a. High fluid pressure is then applied to the piston 138, with the result that knurled surfaces 121¹ tightly grip the portions of the side wall of the segment 4 adjacent the side wall corrugation 13, holding them securely against face plate 88, and spring 150 is compressed, and the end 134¹ of rod 134 bottoms out in bore 136 in piston 138. Continued forward travel of the piston 138 then results in the forward displacement of the smasher plate 132, which retracts the male side die plate 102 to its open die position in which its forward edge is substantially flush with the adjacent forward surfaces of face plate 88, pressure being off at that time behind the piston 98. At the end of its forward travel, smasher plate 132 flattens the corrugation land in the side wall, for a portion of its length extending inwardly from the outer edge of the side wall, against the male side die plate 102 and the forward surfaces of face plate 88 to produce the article as illustrated in FIG. 10a showing the flattened corrugation land portion at 18. FIG. 10 shows the relative positions of the various portions of the apparatus in completing this flattening step. The portion of the side wall having the flattened portion 18 of the corrugation forms the edge flange 20 to be turned up to a position substantially parallel with the base 6, as illustrated in FIGS. 3 and 4, for attachment of the cover sheet 22 thereto in forming the completed sheathed blanket 1 heretofore described.

Upon the completion of the flattening step and the removal of the fluid pressure from the piston 138, side die plate 102, block 112, and smasher plate 132 are returned to normal open die position under the action of springs 148 and 150. Die member 36 may be retracted to open position by the application of fluid pressure to the pistons in cylinders 46 through the conduits 50.

By a simple rearrangement of the side dies, the modified form of the sheathed blanket $1^1$ shown in FIG. 16 can be made on the same apparatus, the steps corresponding to those just described in making the form of blanket illustrated in FIGS. 1–4. Since the procedural steps are similar, they have not all been illustrated. It will be clear from an examination of FIG. 11, illustrating a step corresponding to that shown in FIG. 8, and from an examination of FIGS. 11a, 11b, and 11c, how the apparatus is rearranged and how the base and side wall corrugations appear at the various stages in the operation. In order to form the corrugations in the side walls with their lands extending outwardly thereof, it is necessary to turn the side die structures 52 end-for-end, so that the side die structure at the right of the press as viewed in FIG. 5 would appear as in FIG. 11. It will be noted that in this arrangement spacer blocks 54 abut the side die blocks 58 and space them properly to receive sheet metal segment $4^1$ with the inside faces of its side walls $8^1$ against the forward faces of die plate 88, and with its inside corner $10^1$ mating with the adjacent top and outer end surfaces of the rubber block 86. The spacer blocks and the uppermost surfaces of block 58, including the top surfaces of bars 80 and spacer plate 88 functioning therewith, support the segment $4^1$ in the position described. When the main overhead male die member 36 has been closed to the position indicated in FIG. 11, the groove 83 serves as a portion of the upwardly opening faemale die, and the rubber is extruded to a position such as indicated in FIG. 11, to form the article as shown in FIG. 11a. The manner of cooperation through the succeeding steps of completing the formation of the side wall corrugation $13^1$ outwardly is believed obvious from the previous description of the corresponding steps illustrated in FIGS. 9 and 10. FIGS. 11b and 11c show the appearance of the article after the flattening step has been completed to produce the flattened corrugation portion $18^1$, and the edge flange portion $20^1$ has been turned up substantially parallel with the base $6^1$. It will be noted that in this modified form of the article the flattened portion $18^1$ of the corrugation land lies on the outside face of the side wall. The reference numerals applied to the parts of the sheet metal segment and to the blanket in FIGS. 11, 11a, 11b, 11c, and 16 are the same as those applied to the corresponding parts in the form of the article shown in FIGS. 1–10a, with the exception that the reference numerals have been given prime characters in the last described form of the article.

The relatively short spaces occurring between the several blocks of the side die structures 52 have not been found in either of the operations described above to cause any unfavorable variation in the shape of the corrugation formed by the male die member 36 in the base of the sheet metal segment at the points where the spaces occur.

It will be apparent that the side die plate 102 could be actuated, in either operation, to closed (corrugating) position simultaneously with, or even before the die member 36 is actuated to closed position, the sequence of operations being flexible to some extent.

From the above description of the manner of operation of the novel apparatus of the invention, it will now be evident that the method of the invention in its broader aspects involves the formation of corrugations in a strip of sheet metal having first and second walls extending angularly from each other on a line of junction to form a relatively clearly demarked outside and inside corner at the line of junction, and comprises forming a corrugation in the first wall transversely to the line of junction, with the corrugation land extending inwardly from the inside face of that wall, and with the corrugation groove opening at one end through the other wall at the corner. The method further involves the shaping of a portion of the second wall to form a saddle straddling the first corrugation land adjacent the corner while forming at least a portion of the length of a corrugation in the second wall transversely to the line of junction and having its land extending inwardly from the inside face of that wall and terminating at one end in a fold line of junction with the saddle, which itself terminates in a U-shaped fold line with the end of the walls and land of the first corrugation, the latter fold line preferably lying substantially flush with the outer face of the second wall. The method includes additionally the completion of the corrugation in the other wall to its outer edge, and the flattening of the outer portion of that corrugation. A significant aspect of the method is that the portion of one corrugation adjacent the corner is held in its defined shape, while the portion of the other corrugation adjacent the corner is formed to its stated shape. Another and more particular aspect of the method is the use of extrudable material and its extrusion in a confined path to form a corrugation in one of the walls in response to the formation of a corresponding corrugation in the other wall. The method further includes the specific step of employing extrudable material in the manner described to form that portion of sheet metal to the stated shape adjacent the corner while substantially simultaneously forming the portion of the other corrugation adjacent the corner to its stated shape, the result being to produce the various folds cleanly on smooth, clean fold lines. It will also be noted that the method includes the gripping of the portions of the wall laterally adjacent the portion of the corrugation to be flattened during the flattening step, in order to produce a smooth and regular flattened portion on clean fold lines.

From the above description, it will be evident that we have obtained the objects of our invention. While we have described our invention in rather full detail, it will be understood that these details need not be strictly adhered to but that various changes and modifications may suggest themselves to one skilled in the art, all falling within the scope of the invention as defined by the subjoined claims.

What we claim is:

1. The method of forming corrugations in a strip of sheet metal having first and second walls extending angularly from each other on a line of junction to form a relatively clearly demarked outside and inside corner thereat, said method comprising forming a corrugation in said first wall transversely thereof and generally perpendicular to said line of junction, and with the corrugation land extending inwardly from the inside face of said first wall, and with the corrugation groove opening at one end through said second wall at said corner, and shaping a portion of said second wall to form a saddle straddling at least a portion of said corrugation land adjacent said corner while forming at least a portion of the length of a corrugation in said second wall transversely thereof and generally perpendicular to said line of junction, and with its land extending inwardly from the inside face of the second wall and terminating at one end in a fold line of junction with said saddle.

2. The method defined in claim 1, and completing the formation of the corrugation in the second wall to the outer edge thereof and flattening the outer portion of said corrugation in the second wall against the inside face of said second wall.

3. The method defined in claim 1, and holding the portion of one of said corrugations adjacent said corner in its defined shape while forming the portion of the other corrugation adjacent said corner to its defined shape.

4. The method defined in claim 1, in which the formation of one of said corrugations is accomplished by extruding deformable extrudable material in a confined path against the portion of sheet metal to be corrugated in response to the formation of the other corrugation.

5. The method defined in claim 1, in which the step of forming the portion of one of said corrugations adjacent said corner to the shape defined includes extruding a deformable extrudable material in a confined path against that portion of the sheet metal to be so shaped, while substantially simultaneously forming the portion of the other corrugation adjacent said corner to its defined shape.

6. The method defined in claim 5, including further, completing the formation of the corrugation in the second wall to the outer edge thereof, and flattening the outer portion of said corrugation in the second wall against the inside face of the second wall while gripping the portions of said second wall laterally adjacent to the portion of the corrugation to be flattened.

References Cited in the file of this patent
UNITED STATES PATENTS

| | | |
|---|---|---|
| 2,671,491 | Biordi et al. | Mar. 9, 1954 |
| 2,671,492 | Biordi et al. | Mar. 9, 1954 |
| 2,753,918 | Bradfield | July 10, 1956 |